(12) United States Patent
Michiyama (10) Patent No.: US 7,248,010 B2
(45) Date of Patent: Jul. 24, 2007

(54) WIPER CONTROLLER FOR CONTROLLING WINDSHIELD WIPER

(75) Inventor: Katsunori Michiyama, Toyota (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/334,440

(22) Filed: Jan. 19, 2006

(65) Prior Publication Data

US 2006/0202654 A1 Sep. 14, 2006

(30) Foreign Application Priority Data

Mar. 8, 2005 (JP) ............................. 2005-063977

(51) Int. Cl.
*H02P 1/04* (2006.01)

(52) U.S. Cl. ...................... 318/444; 318/443; 318/480; 318/483

(58) Field of Classification Search ................ 318/444, 318/DIG. 2, 443, 480, 483; 15/250.12; 388/907.5, 388/916; 356/369
See application file for complete search history.

(56) References Cited

U.S. PATENT DOCUMENTS

| 5,059,877 A | 10/1991 | Teder |
| 5,276,389 A * | 1/1994 | Levers ........................ 318/444 |
| 5,844,682 A * | 12/1998 | Kiyomoto et al. ....... 356/237.1 |
| 6,634,225 B1 | 10/2003 | Reime |

FOREIGN PATENT DOCUMENTS

| JP | A-9-109840 | 4/1997 |
| JP | A-9-126998 | 5/1997 |
| JP | A-10-329653 | 12/1998 |
| JP | A-2001-153969 | 6/2001 |

* cited by examiner

*Primary Examiner*—Karen Masih
(74) *Attorney, Agent, or Firm*—Posz Law Group, PLC (57) ABSTRACT

A wiper controller includes: a sensor for detecting a waterdrop on a windshield; a wiper for wiping the windshield; and control means for controlling operation of the wiper. The control means monitors a waterdrop reflection when the sensor detects the waterdrop. The waterdrop reflection is a diffuse reflection of light. The control means operates the wiper with an intermittent wiping operation having a time interval in such a manner that the time interval in a case where the control means decides nonexistence of the waterdrop reflection is set to be longer than the time interval in a case where the control means decides existence of the waterdrop reflection.

20 Claims, 8 Drawing Sheets

WIPER CONTROLLER FOR CONTROLLING WINDSHIELD WIPER

CROSS REFERENCE TO RELATED APPLICATION

This application is based on Japanese Patent Application No. 2005-63977 filed on Mar. 8, 2005, the disclosure of which is incorporated herein by reference.

FIELD OF THE INVENTION

The present invention relates to a wiper controller for controlling a windshield wiper.

BACKGROUND OF THE INVENTION

Recently, a waterdrop dropped on a windshield of an automotive vehicle is detected so that a windshield wiper of the vehicle is automatically operated on the basis of detection of the waterdrop. This type of wiper controller for controlling the wiper to wipe the waterdrop on the windshield automatically is well-known. Thus, a driver of the vehicle needs not to decide whether the wiper is operated, so that driving burden of the driver is reduced when the driver drives the vehicle. Specifically, the driver needs not to judge circumstance of rain. The wiper controller for controlling the wiper is disclosed in, for example, Japanese Patent Application Publication No. H9-109840.

Figure 14:
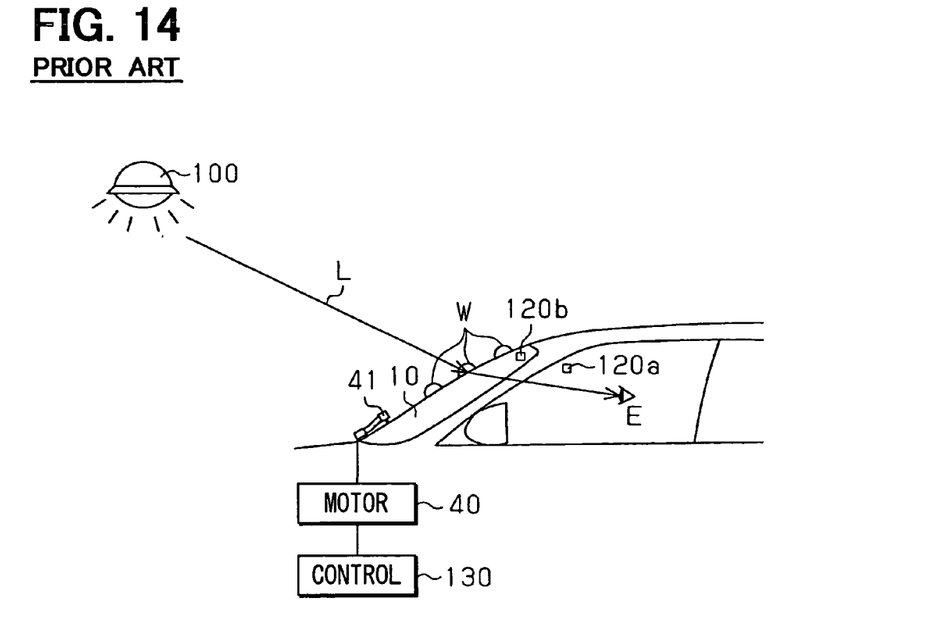
FIG. 14 is a schematic side view showing a wiper controller according to a prior art.
Figure 15:
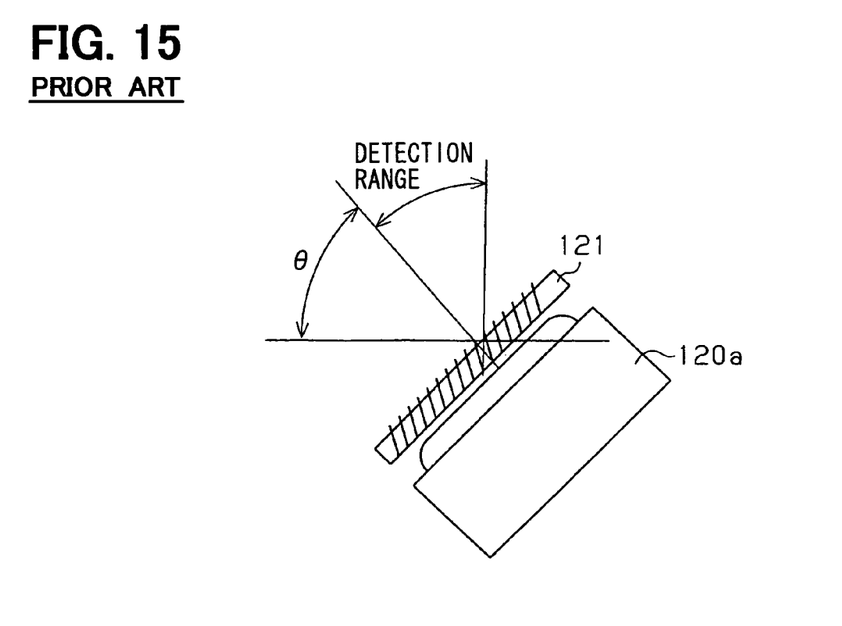
FIG. 15 is a side view showing an illumination sensor in the controller according to the prior art.

As shown in FIG. 14, the wiper controller includes a windshield wiper 41, i.e., a wiper blade for wiping the windshield, a motor 40 as a driving portion for driving the wiper 41, a control portion 130 as control means for controlling operation of the wiper 41 through the motor 40 and determining circumference of rain, an illumination sensor 120a and a waterdrop sensor 120b. The illumination sensor 120a detects illumination of light entered from outside of the vehicle into a compartment of the vehicle through a windshield 10. The waterdrop sensor 120b detects a waterdrop W dropped, i.e., attached to the windshield 10. Detection signals from the illumination sensor 120a and the waterdrop sensor 120b are inputted into the control portion 130. When the driver selects operation of the wiper 41 by using the wiper controller through a wiper switch (not shown), the controller 130 controls to operate the wiper 41 through the motor 40 on the basis of judgment and determination by the controller 130. The illumination sensor 120a includes a louver 121 disposed in front of the sensor 120a, as shown in FIG. 15. The illumination sensor 120a detects the light having a predetermined angle θ and entered into the sensor 120a through the louver 121 so that the sensor 120a outputs a detection signal, i.e., an illumination signal XVIA corresponding to amount of the light. Here, the louver 121 selects the light to be entered into the sensor 120a with the predetermined incident angle θ.

Figure 16:
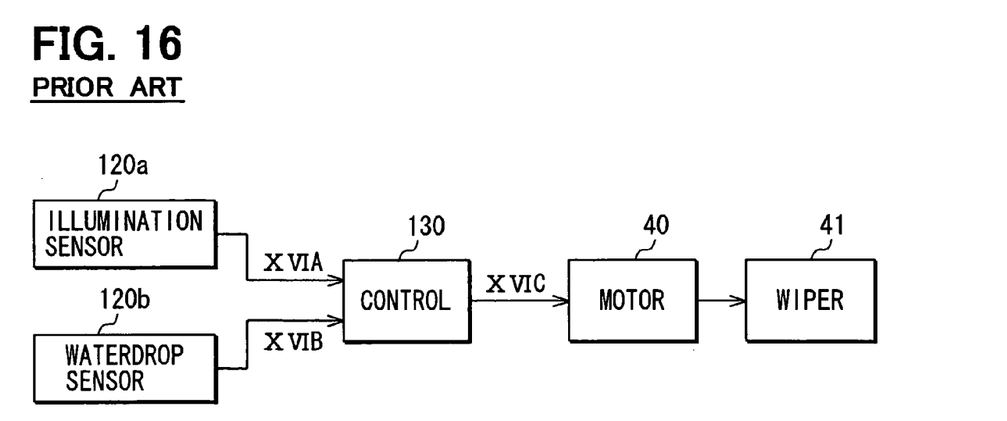
FIG. 16 is a flowchart explaining a method for controlling wiper operation, according to the prior art.

FIG. 16 is an electric block diagram of the wiper controller. The operation of the wire controller is explained as follows with reference to FIGS. 14 to 16. Firstly, the control portion 130 determines whether the waterdrop W is attached to the windshield 10 on the basis of the waterdrop detection signal XVIB outputted from the waterdrop sensor 120b. When the control portion decides that the waterdrop W is attached to the windshield 10, the control portion 130 determines whether it is nighttime on the basis of the illumination signal XVIA outputted from the illumination sensor 120a. When the control portion 130 decides that it is nighttime, the control portion 130 determines whether the light entered from an external light source into the illumination sensor 120a is a light refracted by the waterdrop W. Specifically, as shown in FIG. 14, assuming that the light along with a light pass L is detected by the sensor 120a, firstly, the light is emitted from a light source 100 such as a street light disposed outside of the vehicle. Then, the light is refracted by the waterdrop W disposed on the windshield 10. The refracted light reaches to an eye point E of the driver. The control portion 130 determines whether amount of the light reached the eye point E is equal to or larger than a predetermined threshold amount. When the control portion 130 decides that the amount of the light is larger than the predetermined threshold amount, the control portion 130 outputs a wiper driving signal XVIC to the motor 40. Specifically, when the amount of the light is larger than the predetermined threshold amount, it is considered that the driver's view is blocked by the light reached to the eye point E of the driver. Thus, in this case, the control portion 130 operates the wiper 41 through the motor 40 so that the waterdrop is wiped, if the wiper 41 does not work. Further, when the wiper has already worked, the control portion 130 operates the wiper 41 through the motor 40 by an intermittent wiping operation having a predetermined time interval.

Thus, in the wiper controller, the operation of the wiper 41 is controlled on the basis of the amount of the light entered into the illumination sensor 120a through the windshield 10 with the predetermined angle and detected by the illumination sensor 120a. Therefore, even if the windshield 10 is water-repellent finished, the control portion 130 operates to drive the wiper 41 through the motor 40 in order to remove the waterdrop W when the vehicle runs under the nighttime street light. Thus, it is eliminated that the light is reflected diffusely by the waterdrop W. Accordingly, the driver is protected from blocking his view by the reflection of the light by the waterdrop.

However, since the wiper 41 is actively operated in order to eliminate the waterdrop reflection of the light, the operation of the wiper 41 may interrupt the driver's view. Specifically, although the wiper controller eliminates the waterdrop reflection of the light, the interruption of the operation of the wiper 41 may remain to bother the driver's view. Accordingly, there is a room for improving operation of the wiper 41 so that preferable driving conditions are obtained.

SUMMARY OF THE INVENTION

In view of the above-described problem, it is an object of the present invention to provide a wiper controller for controlling windshield wiper.

A wiper controller includes: a sensor for detecting a waterdrop disposed on a windshield of a vehicle; a wiper disposed on the windshield for wiping the windshield; and control means for controlling operation of the wiper on the basis of amount of the waterdrop. The control means monitors a waterdrop reflection caused by the waterdrop when the sensor detects the waterdrop disposed on the windshield. The waterdrop reflection is a diffuse reflection of light entered from an external light source into a compartment of the vehicle through the waterdrop and the windshield. The control means operates the wiper with an intermittent wiping operation having a time interval in such a manner that the time interval in a case where the control means decides nonexistence of the waterdrop reflection is set to be longer than the time interval in a case where the control means decides existence of the waterdrop reflection.

In the above controller, since the wiper is operated with the intermittent wiping operation having the comparatively short time interval when the waterdrop reflection is occurred, the botheration of the waterdrop reflection is eliminated. Further, when the waterdrop reflection is not occurred, the wiper is operated with the intermittent wiping operation having the comparatively long time interval. Thus, the botheration of the operation of the wiper is sufficiently reduced. Accordingly, the controller can eliminate not only the botheration of the waterdrop reflection but also the botheration of the operation of the wiper; and therefore, the controller provides a preferable driving condition.

Alternatively, the control means may operate the wiper with the intermittent wiping operation on the basis of a monitoring result of existence or nonexistence of the waterdrop reflection under a condition where the amount of the waterdrop detected by the sensor is smaller than a predetermined threshold amount. In this case, the operation of the wiper with the intermittent wiping operation is preferably and automatically performed even when the driver hesitates to operate the wiper with the short time interval or with the long time interval. Accordingly, this automatic wiper operation reduces the burden of the driver. Further, energy consumption of the wiping operation is also reduced.

Alternatively, the sensor is disposed in the compartment of the vehicle. The sensor may be an imaging device for imaging a predetermined part of the windshield from an inside of the compartment of the vehicle, and the control means determines existence or nonexistence of the waterdrop, the amount of the waterdrop and existence or nonexistence of the waterdrop reflection on the basis of an image signal of the windshield inputted from the imaging device. Further, the control means may determine existence or nonexistence of the waterdrop in such a manner that a binarization image of the waterdrop is compared with a master pattern of the waterdrop. The control means filters the image signal of the imaging device by a Laplacian filter so that an outline of the waterdrop is extracted. The control means converts the outline of the waterdrop to the binarization image of the waterdrop, and the control means preliminarily memorizes the master pattern of the waterdrop. Furthermore, the control means may determine the amount of the waterdrop in such a manner that a waterdrop attachment ratio between a total area of the waterdrop on the predetermined part of the windshield and an area of the predetermined part of the windshield is defined as the amount of the waterdrop. The control means decides that it is light rain when the waterdrop attachment ratio is smaller than a predetermined threshold ratio, and the control means decides that it is not light rain when the waterdrop attachment ratio is equal to or larger than the predetermined threshold ratio. Further, the control means may determine existence of the waterdrop reflection when a number of image cells having a luminance equal to or larger than a predetermined threshold luminance is equal to or larger than a predetermined threshold number. The control means determines nonexistence of the waterdrop reflection when the number of image cells having the luminance equal to or larger than the predetermined threshold luminance is smaller than the predetermined threshold number, and each image cell is defined by the outline of the waterdrop so that the luminance of the image cell is defined as a luminance of the outline of the waterdrop.

Alternatively, the control means may compulsorily operate the wiper with a continuous wiping operation or an intermittent wiping operation having a short time interval on the basis of decision of existence of the waterdrop reflection even when the wiper has been operated with the intermittent wiping operation having a long time interval since the control means decided nonexistence of the waterdrop reflection.

Alternatively, the control means may compulsorily switche to operate the wiper with the intermittent wiping operation having a long time interval on the basis of decision of nonexistence of the waterdrop reflection without depending on a previous wiping operation of the wiper.

Further, a wiper controller includes: a sensor for detecting a waterdrop disposed on a windshield of a vehicle; a wiper disposed on the windshield for wiping the windshield; and control means for controlling operation of the wiper on the basis of amount of the waterdrop. The control means monitors a degree of a waterdrop reflection caused by the waterdrop when the sensor detects the waterdrop disposed on the windshield. The waterdrop reflection is a diffuse reflection of light entered from an external light source into a compartment of the vehicle through the waterdrop and the windshield, and the control means operates the wiper with an intermittent wiping operation having a time interval in such a manner that the time interval is set to be longer as the degree of the waterdrop reflection decided by the control means becomes smaller.

In the above controller, since the wiper is operated with the intermittent wiping operation having the comparatively short time interval when the large degree of the waterdrop reflection is occurred, the botheration of the waterdrop reflection is eliminated. Further, when the degree of the waterdrop reflection is comparatively small, the wiper is operated with the intermittent wiping operation having the comparatively long time interval. Thus, the botheration of the operation of the wiper is sufficiently reduced. Accordingly, the controller can eliminate not only the botheration of the waterdrop reflection but also the botheration of the operation of the wiper; and therefore, the controller provides a preferable driving condition.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A wiper controller according to a first embodiment of the present invention is shown in FIGS. 1A to 6. In the controller, an imaging device 20 monitors reflection of light when the waterdrop is attached to a windshield of an automotive vehicle. The reflection of the light is attributed to the waterdrop on the windshield so that the light is reflected diffusely by the waterdrop. On the basis of monitoring of the waterdrop, the controller controls intermittent operation of the wiper 41 in such a manner that a time interval of the intermittent operation of a wiper blade in a case where the controller decides that there is no reflection of the light caused by the waterdrop is set to be longer than that in a case where the controller decides that there is reflection of the light by the waterdrop. In this case, the controller removes the reflection of the light by the waterdrop, i.e., the waterdrop reflection of the light, and further, the interruption of the operation of the wiper 41 is improved.

Figure 1A:
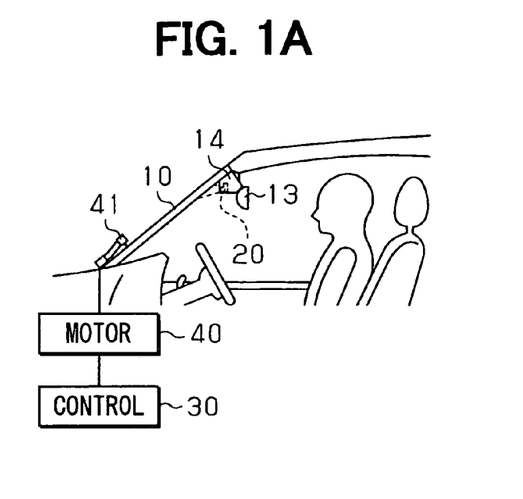
FIG. 1A is a side view showing a wiper controller according to a first embodiment of the present invention.
Figure 1B:
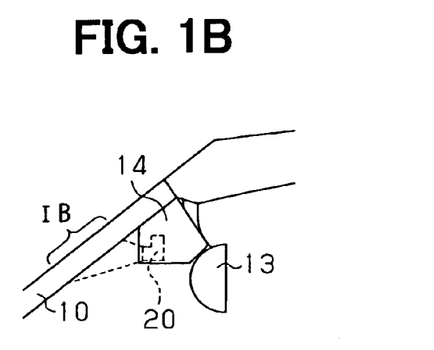
FIG. 1B is a partially enlarged side view showing an imaging device in the controller in FIG. 1A.
Figure 2:
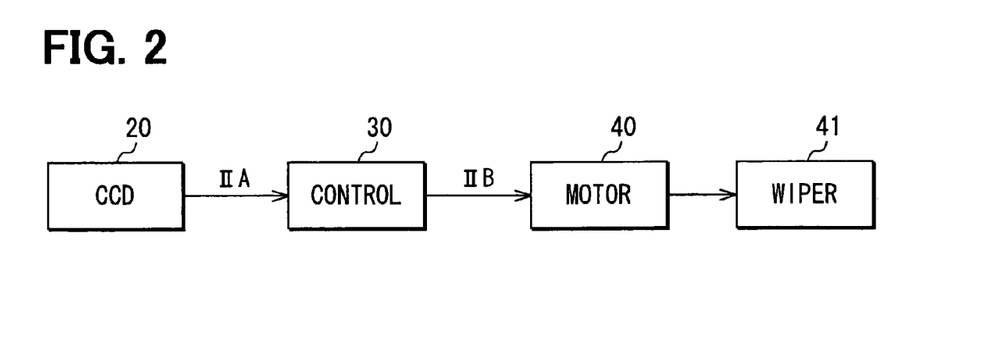
FIG. 2 is a block diagram showing electric connection among parts in the controller according to the first embodiment.

As shown in FIGS. 1A to 2, the wiper controller includes a casing 14, the imaging device 20 as a sensor for the waterdrop, a control portion 30 as control means, a motor 40 and a wiper 41, i.e., a wiper blade. The casing 14 is disposed between a windshield 10 of the vehicle and an inside rear view mirror 13, which is disposed in a compartment of the vehicle. The casing 14 contacts the windshield 10 from the inside of the compartment. The imaging device 20 together with, for example, a periphery circuit for processing the image is accommodated in the casing 14 so that the imaging device 20 and the periphery circuit provide the control means. The imaging device 20 takes the image of a part of the windshield 10 from the compartment, i.e., from the inside of the vehicle. The part of the windshield is defined as an imaging region IB of the windshield, which is predetermined. The control portion 30 as controlling and determining means determines whether there is waterdrop W on the windshield, determines amount of the waterdrop W, and monitors whether there is diffuse reflection of light caused by the waterdrop W. Specifically, the control portion 30 determines and monitors on the basis of image information, i.e., an image signal outputted from the imaging device 20. The motor 40 as driving means for driving the wiper 41 on the basis of a wiper operation signal outputted from the control portion 30. The wiper 41 wipes and removes the waterdrop W attached to the windshield 10 of the vehicle.

Figure 3:
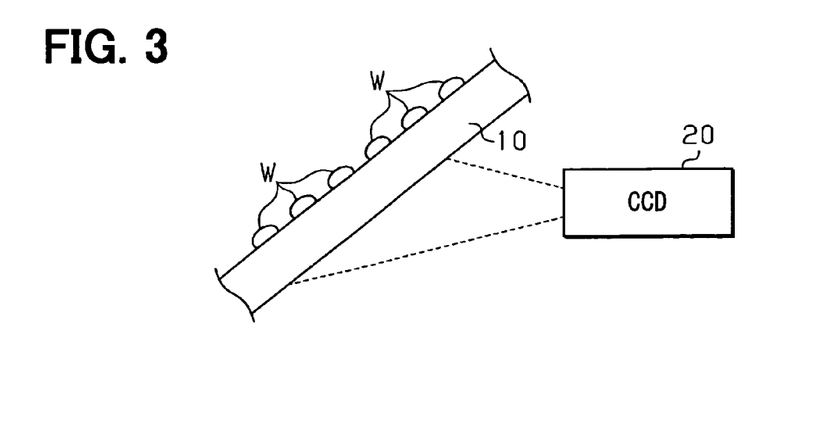
FIG. 3 is a partial side view showing a positioning relationship between a waterdrop on a windshield and the imaging device in the controller according to the first embodiment.
Figure 4:
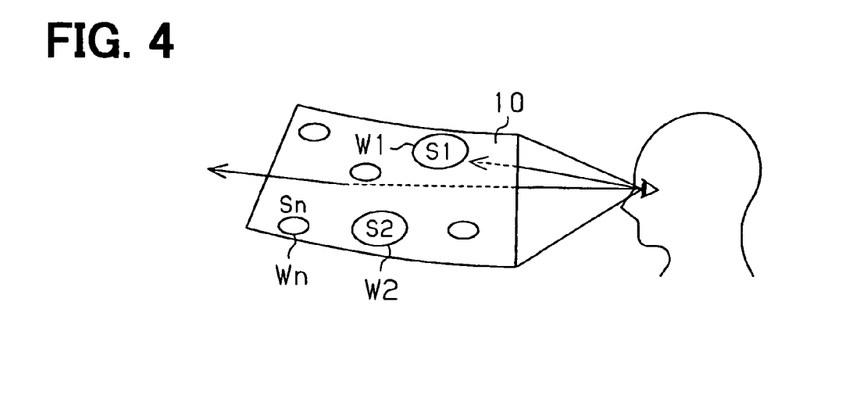
FIG. 4 is a schematic side view showing a positioning relationship between the waterdrop on the windshield and a driver's view in a vehicle, according to the first embodiment.

The imaging device 20 is formed of, for example, a CCD camera (i.e., charge coupled device camera). FIG. 3 shows a positioning relationship between the waterdrop W and the imaging device 20. The imaging device 20 includes a lens, a CCD and the like. A focal depth of the imaging device 20 is, for example, about one meter. Therefore, the imaging device 20 mainly provides the image of the waterdrop W on the windshield 10 without providing image of the outside of the vehicle, i.e., without providing image of landscape. Further, the imaging device 20 has sufficient resolution to detect the diffuse reflection of the light by the waterdrop W so that the control portion 30 can determine the diffuse reflection of the light by the waterdrop W on the basis of the image obtained by the imaging device 20.

The control portion 30 decides whether there is the waterdrop attached to the windshield 10 on the basis of the image signal outputted from the imaging device 20. Further, the control portion 30 decides the amount of the waterdrop on the windshield 10. Further, the control portion 30 monitors the waterdrop reflection, i.e., the diffuse reflection of the light caused by the waterdrop W attached to the windshield 10. Furthermore, the control portion 30 controls to operate the wiper 41 with intermittent wiping operation on the basis of the monitoring of the reflection by the waterdrop W under the condition where the control portion 30 determines that it is light rain, i.e., under the condition where the amount of the waterdrop detected by the image device 20 is smaller than a predetermined threshold amount.

When the control portion 30 decides existence or nonexistence of the waterdrop W, firstly, the image signal inputted from the imaging device 20 is processed by using, for example, a Laplacian filter so that an outline of the waterdrop W is picked out, i.e., extracted. Further, the extracted outline of the waterdrop W is converted into a binarization image. This binarization image is compared with a master pattern memorized in a memory of the control portion 30 so that a pattern matching test between the extracted binarization image and the master pattern is performed. Thus, the control portion 30 decides whether the waterdrop W is attached to the windshield 10.

When the control portion 30 determines the amount of the waterdrop W, firstly, the control portion 30 sums areas of image cells, which is decided as a portion attaching the waterdrop W through the above decision step of the waterdrop W. Next, the control portion 30 calculates an attachment ratio of the waterdrop W between the summation of the areas of the image cells and the area of a part of the windshield within the view field of the driver. Specifically, the attachment ratio Rw is calculated with respect to the following formula F1.

$$Rw = \Sigma(Sn/So) \tag{F1}$$

Here, the area of the part of the windshield within the view field of the driver is defined as So. The area of the waterdrop W1 is defined as the waterdrop area S1, the area of next waterdrop W2 is defined as the waterdrop area S2, and so on. The area of the last waterdrop Wn is defined as the waterdrop area Sn. Thus, the attachment ratio Rw of the waterdrop W per unit time is obtained. When the attachment ratio Rw is equal to or larger than a predetermined threshold ratio, the control portion 30 determines that it is not light rain. When the attachment ratio Rw is smaller than the predetermined threshold ratio, the control portion 30 determines that it is light rain.

When the control portion 30 monitors the reflection by the waterdrop W, firstly, the control portion 30 calculates luminance change of the outline of the waterdrop W, which is obtained by the decision step of the waterdrop W. The control portion 30 monitors existence or nonexistence of the reflection by the waterdrop W on the basis of the luminance change. Specifically, when the waterdrop W is attached to the windshield 10, the waterdrop W functions as a convex lens. Accordingly, when the light emitted from the external light source such as the street light and the light from an oncoming vehicle is reflected diffusely by the waterdrop W attached to the windshield, a part of the outline of the waterdrop disposed on a lower part of the waterdrop W tends to become brighter. Thus, when the waterdrop W having the bright lower part is imaged by the imaging device 20, the luminance of the lower part of the outline of the waterdrop W is inclined to be higher than that of the other part of the outline. In this embodiment, when the number of the image cells having the luminance equal to or higher than the predetermined luminance is equal to or larger than a predetermined threshold number, the control portion 30 decides that there is the reflection by the waterdrop W. When the number of the image cells is smaller than the threshold number, the control portion 30 decides that there is no reflection by the waterdrop W.

Figure 5A:
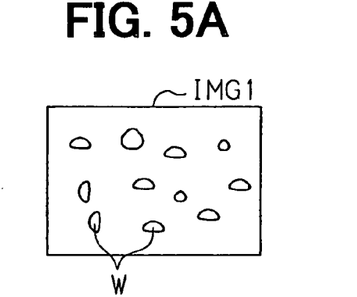
FIG. 5A is an image of the imaging device in a case of existence of the waterdrop.
Figure 5B:
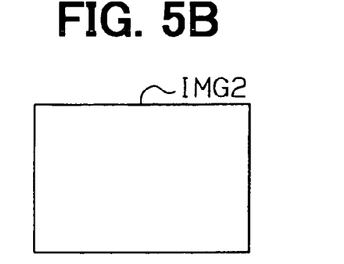
FIG. 5B is an image of the imaging device in a case of nonexistence of the waterdrop, according to the first embodiment.

FIGS. 5A and 5B show samples of the image of the imaging device 20 when the control portion 30 determines whether the reflection by the waterdrop W exists. Specifically, when the waterdrop W is attached to the windshield 10 so that the reflection by the waterdrop W is occurred, the imaging device 20 provides the image IMG1 shown in FIG. 5A. In this case, the driver recognizes the existence of the waterdrop W attached to the windshield 10, and the diffuse reflection by the waterdrop W hinders the driver's view. Accordingly, to secure the driver's view, i.e., to eliminate botheration of the diffuse reflection, it is preferred that the waterdrop W is wiped by the wiper 41. Therefore, the control portion 30 drives the wiper 41 through the motor 40.

Even when the waterdrop W is attached to the windshield 10, no diffuse reflection by the waterdrop W may be occurred in a case, for example, where there is no street light in front of the vehicle. In this case, the imaging device 20 provides the image IMG2 shown in FIG. 5B. In this case, the driver may not recognize the existence of the waterdorp W on the windshield 10, so that the driver's view is sufficiently secured. Accordingly, in this case, it is preferred that the operation of the wiper 41 is refrained rather than performed to wipe the waterdrop W. Thus, the botheration of the operation of the wiper 41 is eliminated. Specifically, the control portion 30 controls to operate the wiper 41 with intermittent wiping operation in such a manner that the time interval of the wiper 41 in a case where the control portion 30 decides that there is no diffuse reflection by the waterdrop W is set to be longer than the time interval in a case where the control portion 30 decides that there is the diffuse reflection by the waterdrop W.

Figure 6:
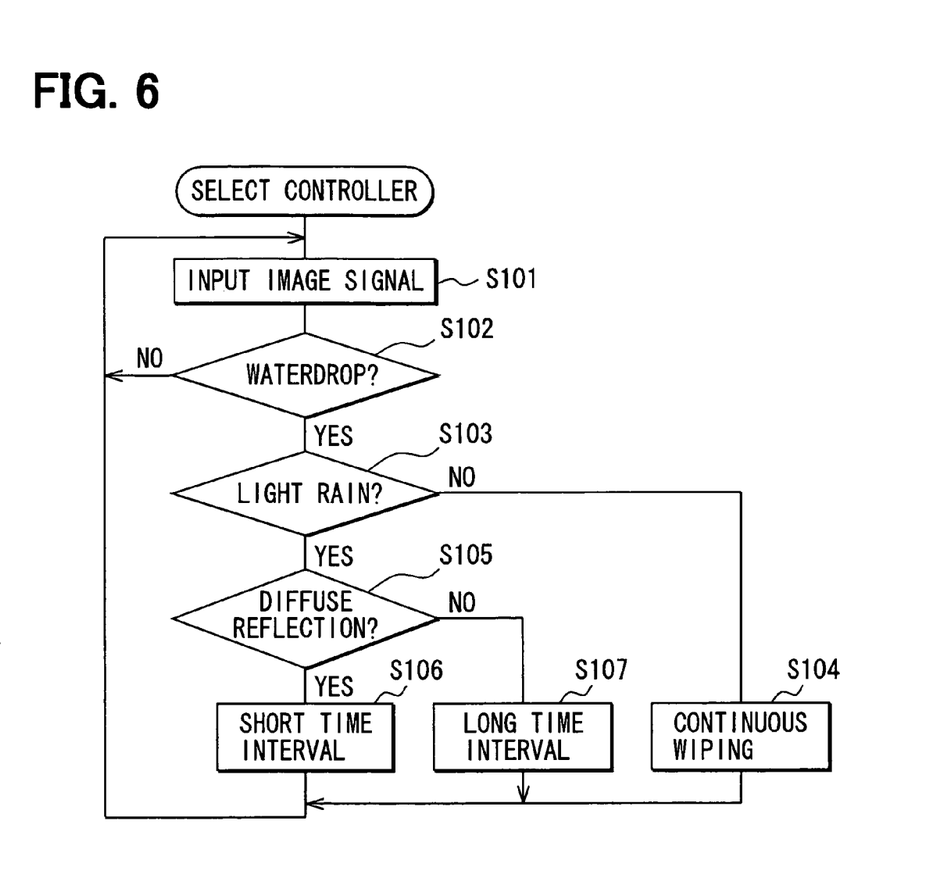
FIG. 6 is a flowchart explaining a method for controlling wiper operation, according to the first embodiment.
Figure 7A:
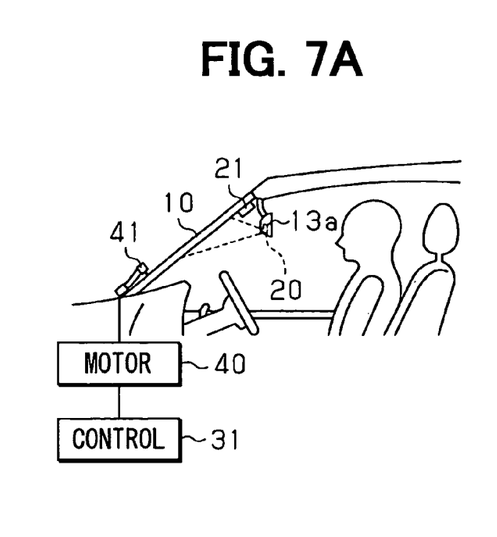
FIG. 7A is a side view showing a wiper controller according to a second embodiment of the present invention.
Figure 7B:
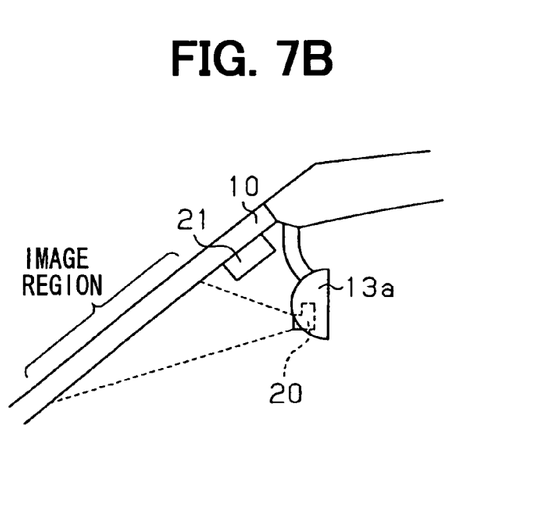
FIG. 7B is a partially enlarged side view showing an imaging device in the controller in FIG. 7A.
Figure 8:
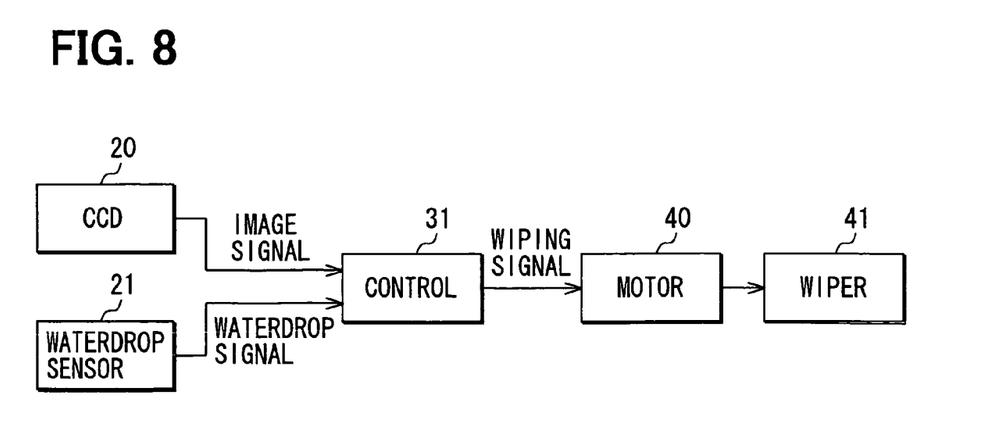
FIG. 8 is a block diagram showing electric connection among parts in the controller according to the second embodiment.

FIG. 6 shows processing steps of the control portion 30 to control the operation of the wiper 41.

Firstly, the operation of the wiper 41 by the wiper controller is selected by the driver through a wiper switch (not shown). Under this condition, Step S101 is performed. In Step S101, the image of the windshield outputted from the imaging device 20 is inputted as the image signal into the control portion 30. Further, on the basis of the image signal, the outline of the waterdrop W is extracted by using the Laplacian filter or the like, and then, the outline is converted into the binarization image.

In Step S102, the binarization image is compared with the master pattern by the pattern matching method so that existence or nonexistence of the waterdrop W is determined. When the control portion 30 decides that no waterdrop W is attached to the windshield 10 on the basis of the pattern matching method, it returns to Step S101. This means that Steps S101 and S102 are repeatedly performed till the waterdrop W is detected.

When the control portion 30 decides that the waterdrop W is attached to the windshield 10 on the basis of the pattern matching method, it goes to Step S103. In Step S103, the control portion determines whether it is light rain. Specifically, the control portion 30 determines whether the waterdrop attachment ratio Rw is smaller than the predetermined threshold ratio. When the control portion 30 decides that it is not light rain or there is splash of the waterdrop W, it goes to Step S104 so that the control portion 30 outputs the wiper operation signal to the motor 40 in order to operate the wiper 41 continuously. Thus, the motor 40 drives the wiper 41 continuously on the basis of the wiper operation signal so that the driver's view is secured.

When the control portion 30 decides that it is light rain, it goes to Step S105. In Step S105, the control portion 30 determines whether the reflection by the waterdrop W exists. Specifically, the control portion 30 determines whether the diffuse reflection is occurred on the basis of the luminance of the outline of the waterdrop W and the outline of the waterdrop W obtained from the imaging device 20. When the number of the image cells having the luminance equal to or higher than the predetermined threshold luminance is equal to or larger than the predetermined threshold number, the control portion 30 decides that there is the diffuse reflection by the waterdrop W, and it goes to Step S106. When the number of the image cells is smaller than the threshold number, the control portion 30 decides that there is no diffuse reflection, and it goes to Step S107. When the control portion 30 decides the existence of the reflection, in Step S106, the time interval of the intermittent wiper operation is set to be short. The control portion 30 outputs the wiper operation signal corresponding to the short time interval to the motor 40. The motor 40 drives the wiper with the intermittent wiper operation having the short time interval such as 0.5 seconds time interval, which is defined by the wiper operation signal.

When the control portion 30 decides nonexistence of the reflection, in Step S107, the time interval of the intermittent wiper operation is set to be long. The control portion 30 outputs the wiper operation signal corresponding to the long time interval to the motor 40. The motor 40 drives the wiper with the intermittent wiper operation having the long time interval such as 2.0 seconds time interval, which is defined by the wiper operation signal.

Thus, the wiper controller provides not only to eliminate the botheration of the diffuse reflection but also to eliminate the botheration of the wiper operation so that the driver drives the vehicle more preferably when it is rain. Further, when it is light rain, i.e., when the amount of the waterdrop W is smaller than the predetermined threshold amount, the control portion 30 operates the wiper 41 with the intermittent wiping operation. Thus, the operation of the wiper 41 with the intermittent wiping operation is preferably and automatically performed even when the driver hesitates to operate the wiper 41 with the short time interval or with the long time interval. Accordingly, this automatic wiper operation reduces the burden of the driver. Further, energy consumption of the wiping operation is also reduced.

Further, the imaging device 20 monitors existence of the waterdrop W, amount of the waterdrop W and existence of the diffuse reflection. Accordingly, even when it is night time, the diffuse reflection can be monitored easily by the imaging device 20.

Since the imaging device 20 together with a periphery circuit is accommodated in the casing 14 between the windshield and the inside rear view mirror 13, the position of the imaging device 20 does not block the driver's view. Further, the imaging device 20 can detects attachment of the waterdrop W on the windshield 10 accurately.

Second Embodiment

A wiper controller according to a second embodiment of the present invention is shown in FIGS. 7A to 10. The imaging device 20 is accommodated in an inside rear view mirror 13a in the compartment of the vehicle. Further, the controller includes a light-reflection type waterdrop sensor 21 contacting the windshield 10. The control portion 31 receives the image signal outputted from the imaging device 20 and a waterdrop sensor signal outputted from the waterdrop sensor 21. On the basis of the waterdrop sensor signal, the control portion 31 determines the existence of the waterdrop W and monitors the amount of the waterdrop W.

Figure 9:
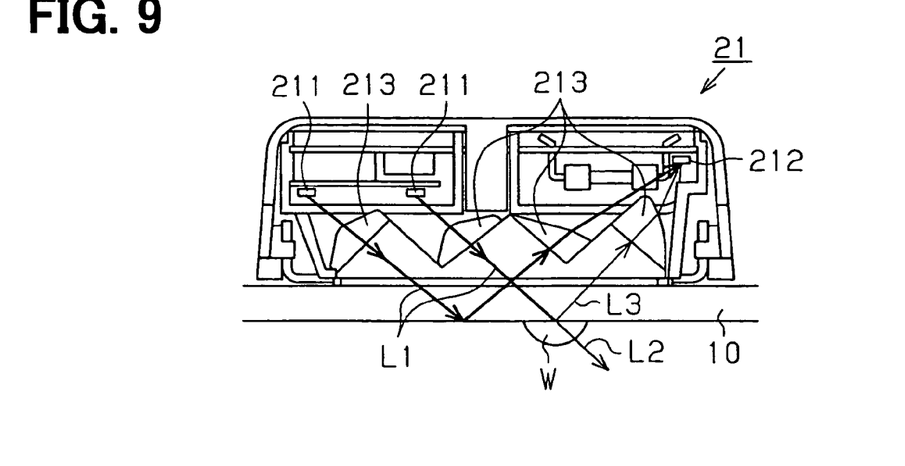
FIG. 9 is a front view showing an inside of a waterdrop sensor in the controller according to the second embodiment.

FIG. 9 shows the inside construction of the waterdrop sensor 21. The waterdrop sensor 21 includes a light emitting element 211, a light receiving element 212 and a prism 213. The light emitting element 211 emits infra-red light from the compartment of the vehicle toward the windshield 10. The prism 213 controls and provides a light path of the infra-red light emitted from the light emitting element 211. The light receiving element 212 receives the reflected infra-red light by the windshield 10. The control portion 30 detects existence of the waterdrop W on the windshield 10 and the amount of the waterdrop W on the basis of the amount of light received by the light receiving element 212.

Specifically, when no waterdrop is disposed on the windshield 10, the infra-red light L1 emitted from the light emitting device 211 is substantially reflected by the surface of the windshield 10; and therefore, the reflected light having the amount of light almost equal to the amount of light emitted from the light emitting element 211 is received by the light receiving element 212. When the waterdrop W is disposed on the windshield 10, the waterdrop W functions as a convex lens, so that a part of the infra-red light L2 emitted from the light emitting element 211 transmits the windshield 10. Thus, the incident light L1 separates into the part of the light L2 transmitting the windshield and the other part of the light L3 reflected by the windshield 10. Accordingly, the other part of the light L3 as the reflection light, which is reduced from the incident light L1 by the transmission light L2, is received by the light receiving element 212. Accordingly, the waterdrop sensor 21 outputs a voltage signal corresponding to the amount of light received by the receiving element 212, which depends on the amount of the waterdrop W attached to the windshield 10. The waterdrop sensor 21 outputs the voltage signal as a waterdrop sensor signal to the control portion 31. Thus, the waterdrop sensor 21 can detect the existence of the waterdrop W and the amount of the waterdrop W.

Figure 10:
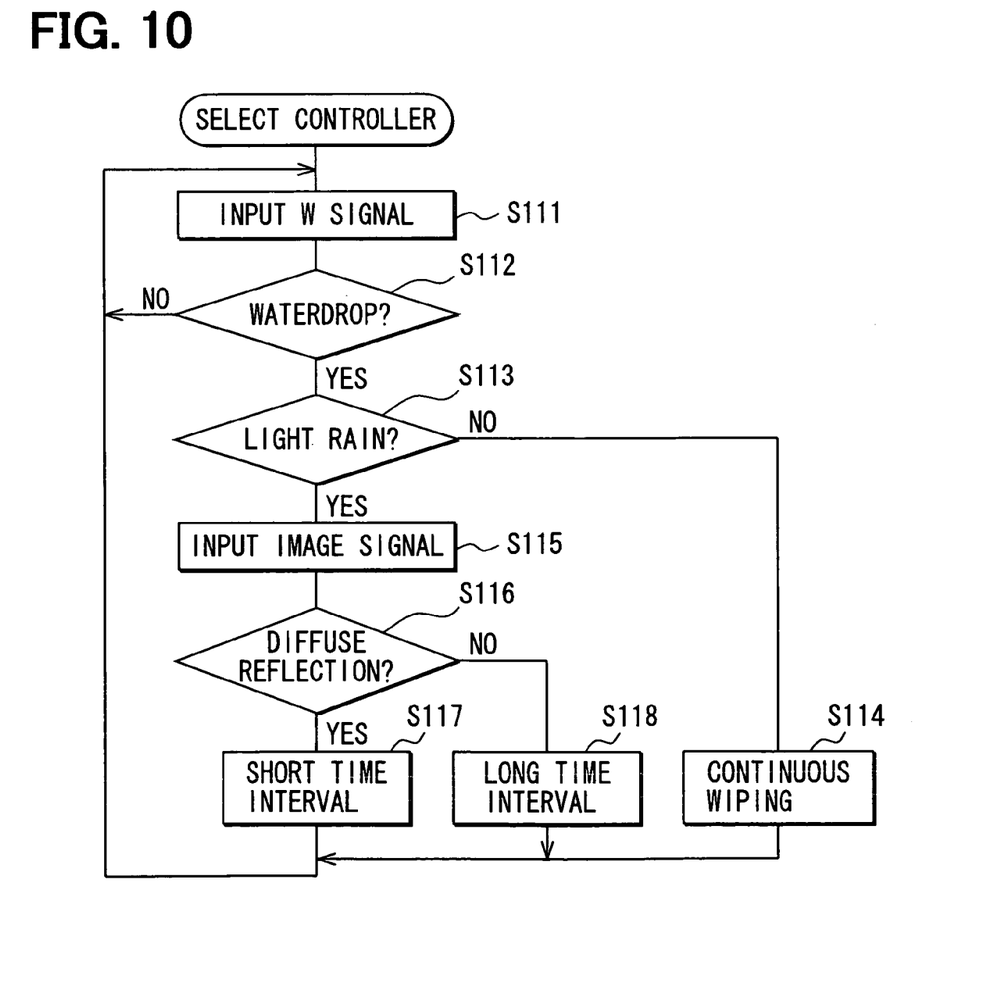
FIG. 10 is a flowchart explaining a method for controlling wiper operation, according to the second embodiment.

FIG. 10 shows processing steps of the control portion 30 to control the operation of the wiper 41.

Under the condition that the operation of the wiper 41 by the wiper controller is selected by the driver, Step S111 is performed. In Step S111, the voltage signal as the waterdrop sensor signal corresponding to the amount of the waterdrop W attached to the windshield 10 is inputted into the control portion 31.

In Step S112, existence or nonexistence of the waterdrop W is determined. When the control portion 30 decides that no waterdrop W is attached to the windshield 10, it returns to Step S111. This means that Steps S111 and S112 are repeatedly performed till the waterdrop W is detected.

When the control portion 30 decides that the waterdrop W is attached to the windshield 10, it goes to Step S113. In Step S113, the control portion 30 determines whether it is light rain. Specifically, the control portion 30 determines whether the waterdrop sensor signal outputted from the sensor 21 is larger than a predetermined threshold signal. When the control portion 30 decides that it is not light rain or there is splash of the waterdrop W, it goes to Step S114 so that the control portion 30 outputs the wiper operation signal to the motor 40 in order to operate the wiper 41 continuously. Thus, the motor 40 drives the wiper 41 continuously on the basis of the wiper operation signal so that the driver's view is secured.

When the control portion 30 decides that it is light rain, it goes to Step S115. In Step S115, the image of the windshield outputted from the imaging device 20 is inputted as the image signal into the control portion 30, and then, it goes to Step S116. In Step S116, the control portion 30 determines whether the reflection by the waterdrop W exists. Specifically, the control portion 30 determines whether the diffuse reflection is occurred on the basis of the luminance of the outline of the waterdrop W and the outline of the waterdrop W obtained from the imaging device 20. When the number of the image cells having the luminance equal to or higher than the predetermined threshold luminance is equal to or larger than the predetermined threshold number, the control portion 30 decides that there is the diffuse reflection by the waterdrop W, and it goes to Step S117. When the number of the image cells is smaller than the threshold number, the control portion 30 decides that there is no diffuse reflection, and it goes to Step S118. When the control portion 30 decides the existence of the reflection, in Step S117, the time interval of the intermittent wiper operation is set to be short. The control portion 30 outputs the wiper operation signal corresponding to the short time interval to the motor 40. The motor 40 drives the wiper with the intermittent wiper operation having the short time interval such as 0.5 seconds time interval, which is defined by the wiper operation signal.

When the control portion 30 decides nonexistence of the reflection, in Step S118, the time interval of the intermittent wiper operation is set to be long. The control portion 30 outputs the wiper operation signal corresponding to the long time interval to the motor 40. The motor 40 drives the wiper with the intermittent wiper operation having the long time interval such as 2.0 seconds time interval, which is defined by the wiper operation signal.

Thus, the wiper controller provides not only to eliminate the botheration of the diffuse reflection but also to eliminate the botheration of the wiper operation so that the driver drives the vehicle more preferably when it is rain. Further, when it is light rain, i.e., when the amount of the waterdrop W is smaller than the predetermined threshold amount, the control portion 30 operates the wiper 41 with the intermittent wiping operation. Thus, the operation of the wiper 41 with the intermittent wiping operation is preferably and automatically performed even when the driver hesitates to operate the wiper 41 with the short time interval or with the long time interval. Accordingly, this automatic wiper operation reduces the burden of the driver. Further, energy consumption of the wiping operation is also reduced.

Since the existence of the waterdrop W and the amount of the waterdrop W are determined on the basis of the sensor signal outputted from the water drop sensor 21, the decision of the existence of the waterdrop reflection, i.e., the diffuse reflection by the waterdrop W is performed on the basis of the image obtained from the imaging device 20. Thus, the degree of freedom of processing in the control portion 31 is increased.

Since the imaging device 20 together with a periphery circuit is accommodated in the inside rear view mirror 13a in the compartment, the position of the imaging device 20 does not block the driver's view. Further, the imaging device 20 can detects attachment of the waterdrop W on the windshield 10 accurately.

(Modifications)

Figure 11A:
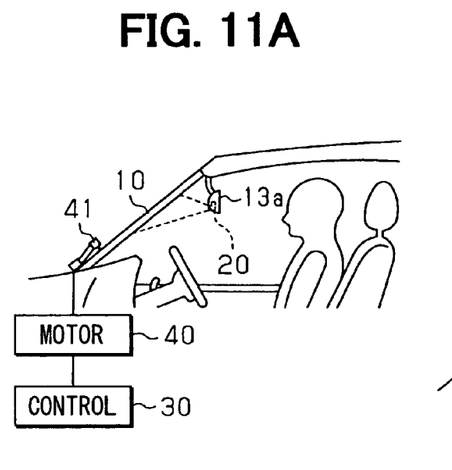
FIG. 11A is a side view showing a wiper controller according to a modification of the first embodiment.
Figure 11B:
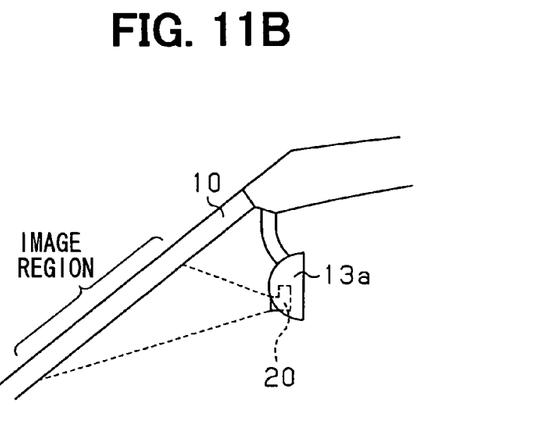
FIG. 11B is a partially enlarged side view showing an imaging device in the controller in FIG. 11A.

Although the imaging device 20 together with a periphery circuit is disposed between the windshield 10 and the inside rear view mirror 13 in the controller in FIG. 1A, the imaging device 20 together with the periphery circuit may be accommodated in an inside rear view mirror 13a, as shown in FIG. 11.

Figure 12:
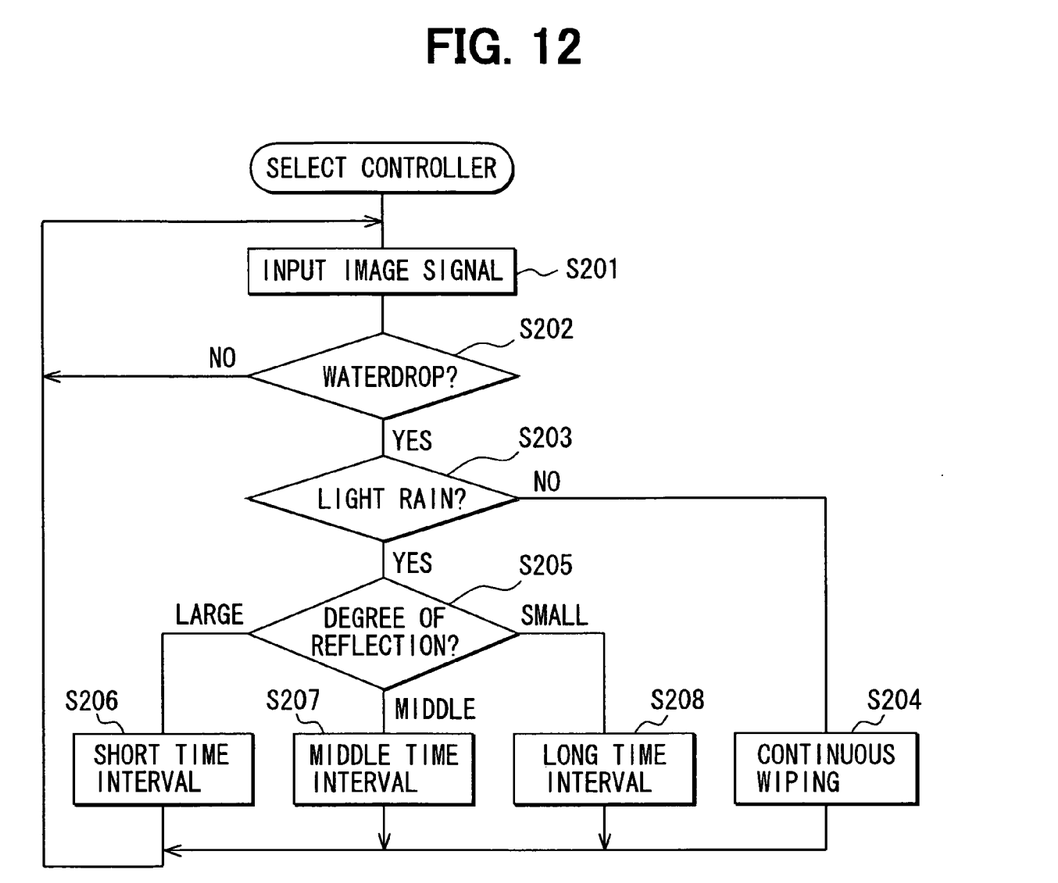
FIG. 12 is a flowchart explaining a method for controlling wiper operation, according to a second modification of the first embodiment.

Although the control portion 30 determines the time interval of the intermittent wiper operation on the basis of the existence of the diffuse reflection in Step S105 in FIG. 6, the control portion 30 may determine the time interval of the intermittent wiper operation on the basis of the degree of the diffuse reflection. Specifically, as shown in FIG. 12, the control portion 30 determines the degree of the diffuse reflection in Step S205. More specifically, when the number of the image cells having the luminance equal to or larger than a predetermined luminance is larger than a first predetermined threshold RD11, the control portion 30 decides that the degree of the diffuse reflection by the waterdrop W is large. When the number of the image cells having the luminance equal to or larger than a predetermined luminance is smaller than a second predetermined threshold RD12, the control portion 30 decides that the degree of the diffuse reflection by the waterdrop W is small. When the number of the image cells having the luminance equal to or larger than a predetermined luminance is in a range between the first predetermined threshold RD11 and the second predetermined threshold RD12, the control portion 30 decides that the degree of the diffuse reflection by the waterdrop W is intermediate, i.e., middle. Here, the first predetermined threshold RD11 is larger than the second predetermined threshold RD12. When the control portion 30 decides the large degree of the diffuse reflection, it goes to Step S206 so that the wiper 41 is operated with the intermittent wiper operation having the short time interval. When the control portion 30 decides the intermediate degree of the diffuse reflection, it goes to Step S207 so that the wiper 41 is operated with the intermittent wiper operation having the intermediate time interval. When the control portion 30 decides the small degree of the diffuse reflection, it goes to Step S208 so that the wiper 41 is operated with the intermittent wiper operation having the long time interval. In these cases, the control portion 30 controls the wiper 41 with multiple operation steps corresponding to the degree of the reflection, so that the driver drives the vehicle more comfortably.

Figure 13:
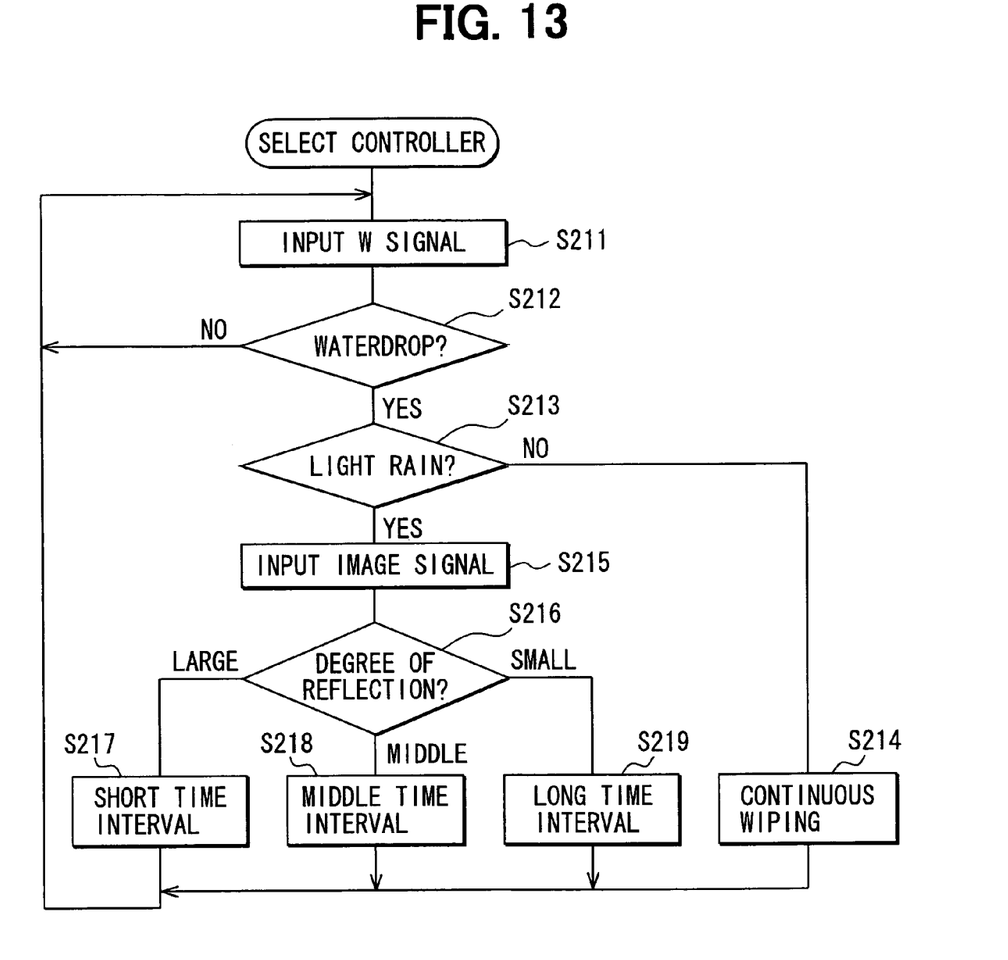
FIG. 13 is a flowchart explaining a method for controlling wiper operation, according to a modification of the second embodiment.

Although the control portion 30 determines the time interval of the intermittent wiper operation on the basis of the existence of the diffuse reflection in Step S116 in FIG. 10, the control portion 30 may determine the time interval of the intermittent wiper operation on the basis of the degree of the diffuse reflection. Specifically, as shown in FIG. 13, the control portion 30 determines the degree of the diffuse reflection in Step S216. More specifically, when the number of the image cells having the luminance equal to or larger than a predetermined luminance is larger than a first predetermined threshold RD21, the control portion 30 decides that the degree of the diffuse reflection by the waterdrop W is large. When the number of the image cells having the luminance equal to or larger than a predetermined luminance is smaller than a second predetermined threshold RD22, the control portion 30 decides that the degree of the diffuse reflection by the waterdrop W is small. When the number of the image cells having the luminance equal to or larger than a predetermined luminance is in a range between the first predetermined threshold RD21 and the second predetermined threshold RD22, the control portion 30 decides that the degree of the diffuse reflection by the waterdrop W is intermediate. Here, the first predetermined threshold RD21 is larger than the second predetermined threshold RD22. When the control portion 30 decides the large degree of the diffuse reflection, it goes to Step S217 so that the wiper 41 is operated with the intermittent wiper operation having the short time interval. When the control portion 30 decides the intermediate degree of the diffuse reflection, it goes to Step S218 so that the wiper 41 is operated with the intermittent wiper operation having the intermediate time interval. When the control portion 30 decides the small degree of the diffuse reflection, it goes to Step S219 so that the wiper 41 is operated with the intermittent wiper operation having the long time interval. In these cases, the control portion 30 controls the wiper 41 with multiple operation steps corresponding to the degree of the reflection, so that the driver drives the vehicle more comfortably.

The time interval of the intermittent wiper operation is determined on the basis of the existence of the diffuse reflection or on the basis of the degree of the diffuse reflection. However, the wiper 41 may be operated compulsorily on the basis of the existence of the waterdrop W or on the basis of the large degree of the diffuse reflection even when the control portion 30 has decided to operate the wiper with the intermittent wiper operation having the long time interval. Thus, the wiper operation is switched from the intermittent wiping operation having the long time interval to the intermittent wiping operation having the short time interval or to the continuous wiping operation.

The continuous wiping operation is determined on the basis of the amount of the waterdrop W, i.e., on the basis of the determination whether it is light rain. However, the wiper 41 may be operated compulsorily with the intermittent wiper operation on the basis of the nonexistence of the waterdrop W or on the basis of the small degree of the diffuse reflection even when the control portion 30 has decided to operate the wiper with the continuous wiping operation. Thus, the wiper operation is switched from the continuous wiping operation to the intermittent wiping operation having the long time interval or the short time interval.

Although the imaging device 20 monitors the diffuse reflection, other sensors may be used for monitoring the diffuse reflection as long as the sensor can detect the diffuse reflection caused by the waterdrop W on the windshield 10.

Although the wiper controller controls the wiper 41 for wiping the windshield of the automotive vehicle, the wiper controller may be used for a general vehicle such as a train, an airplane, a ship and other mobile bodies.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A wiper controller comprising:

a sensor for detecting a waterdrop disposed on a windshield of a vehicle;

a wiper disposed on the windshield for wiping the windshield; and control means for controlling operation of the wiper on the basis of amount of the waterdrop, wherein the control means monitors a waterdrop reflection caused by the waterdrop when the sensor detects the waterdrop disposed on the windshield, the waterdrop reflection is a diffuse reflection of light entered from an external light source into a compartment of the vehicle through the waterdrop and the windshield, and the control means operates the wiper with an intermittent wiping operation having a time interval in such a manner that the time interval in a case where the control means decides nonexistence of the waterdrop reflection is set to be longer than the time interval in a case where the control means decides existence of the waterdrop reflection, wherein the sensor is disposed in the compartment of the vehicle, the sensor is an imaging device for imaging a predetermined part of the windshield from an inside of the compartment of the vehicle, the control means determines existence or nonexistence of the waterdrop, the amount of the waterdrop and existence or nonexistence of the waterdrop reflection on the basis of an image signal of the windshield inputted from the imaging device, the control means determines existence or nonexistence of the waterdrop in such a manner that a binarization image of the waterdrop is compared with a master pattern of the waterdrop, the control means filters the image signal of the imaging device by a Laplacian filter so that an outline of the waterdrop is extracted, the control means converts the outline of the waterdrop to the binarization image of the waterdrop, and the control means preliminarily memorizes the master pattern of the waterdrop.

2. The controller according to claim 1, wherein the control means operates the wiper with the intermittent wiping operation on the basis of a monitoring result of existence or nonexistence of the waterdrop reflection under a condition where the amount of the waterdrop detected by the sensor is smaller than a predetermined threshold amount.

3. The controller according to claim 2, wherein the control means operates the wiper with a continuous wiping operation under a condition where the amount of the waterdrop detected by the sensor is equal to or larger than the predetermined threshold amount.

4. The controller according to claim 1, wherein the control means determines the amount of the waterdrop in such a manner that a waterdrop attachment ratio between a total area of the waterdrop on the predetermined part of the windshield and an area of the predetermined part of the windshield is defined as the amount of the waterdrop, the control means decides that it is light rain when the waterdrop attachment ratio is smaller than a predetermined threshold ratio, and the control means decides that it is not light rain when the waterdrop attachment ratio is equal to or larger than the predetermined threshold ratio.

5. The controller according to claim 4, wherein the control means determines existence of the waterdrop reflection when a number of image cells having a luminance equal to or larger than a predetermined threshold luminance is equal to or larger than a predetermined threshold number, the control means determines nonexistence of the waterdrop reflection when the number of image cells having the luminance equal to or larger than the predetermined threshold luminance is smaller than the predetermined threshold number, and each image cell is defined by the outline of the waterdrop so that the luminance of the image cell is defined as a luminance of the outline of the waterdrop.

6. The controller according to claim 1, wherein the control means compulsorily operates the wiper on the basis of decision of existence of the waterdrop reflection even when the wiper has been operated with the intermittent wiping operation having a long time interval since the control means decided nonexistence of the waterdrop reflection.

7. The controller according to claim 6, wherein the control means compulsorily operates the wiper in such a manner that the wiper is operated with a continuous wiping operation or an intermittent wiping operation having a short time interval.

8. The controller according to claim 1, wherein the control means compulsorily switches to operate the wiper with the intermittent wiping operation on the basis of decision of nonexistence of the waterdrop reflection without depending on a previous wiping operation of the wiper.

9. The controller according to claim 8, wherein the control means compulsorily switches to operate the wiper with the intermittent wiping operation having a long time interval.

10. The controller according to claim 1, wherein the vehicle is an automotive vehicle, a train, a boat, or an airplane.

11. A wiper controller comprising:

a sensor for detecting a waterdrop disposed on a windshield of a vehicle;

a wiper disposed on the windshield for wiping the windshield; and control means for controlling operation of the wiper on the basis of amount of the waterdrop, wherein the control means monitors a degree of a waterdrop reflection caused by the waterdrop when the sensor detects the waterdrop disposed on the windshield, the waterdrop reflection is a diffuse reflection of light entered from an external light source into a compartment of the vehicle through the waterdrop and the windshield, and the control means operates the wiper with an intermittent wiping operation having a time interval in such a manner that the time interval is set to be longer as the degree of the waterdrop reflection decided by the control means becomes smaller, wherein the sensor is disposed in the compartment of the vehicle, the sensor is an imaging device for imaging a predetermined part of the windshield from an inside of the compartment of the vehicle, the control means determines existence or nonexistence of the waterdrop, the amount of the waterdrop and the degree of the waterdrop reflection on the basis of an image signal of the windshield inputted from the imaging device, the control means determines existence or nonexistence of the waterdrop in such a manner that a binarization image of the waterdrop is compared with a master pattern of the waterdrop, the control means filters the image signal of the imaging device by a Laplacian filter so that an outline of the waterdrop is extracted, the control means converts the outline of the waterdrop to the binarization image of the waterdrop, and the control means preliminarily memorizes the master pattern of the waterdrop.

12. The controller according to claim 11, wherein the control means operates the wiper with the intermittent wiping operation on the basis of a monitoring result of the degree of the waterdrop reflection under a condition where the amount of the waterdrop detected by the sensor is smaller than a predetermined threshold amount.

13. The controller according to claim 12, wherein the control means operates the wiper with a continuous wiping operation under a condition where the amount of the waterdrop detected by the sensor is equal to or larger than the predetermined threshold amount.

14. The controller according to claim 11, wherein the control means determines the amount of the waterdrop in such a manner that a waterdrop attachment ratio between a total area of the waterdrop on the predetermined part of the windshield and an area of the predetermined part of the windshield is defined as the amount of the waterdrop, the control means decides that it is light rain when the waterdrop attachment ratio is smaller than a predetermined threshold ratio, and the control means decides that it is not light rain when the waterdrop attachment ratio is equal to or larger than the predetermined threshold ratio.

15. The controller according to claim 14, wherein the control means determines that the degree of the waterdrop reflection is large when a number of image cells having a luminance equal to or larger than a predetermined threshold luminance is equal to or larger than a first predetermined threshold number, the control means determines that the degree of the waterdrop reflection is small when the number of image cells having the luminance equal to or larger than the predetermined threshold luminance is smaller than a second predetermined threshold number, the control means determines that the degree of the waterdrop reflection is intermediate when the number of image cells having the luminance equal to or larger than the predetermined threshold luminance is in a range between the first predetermined threshold number and the second predetermined threshold number, the first predetermined threshold number is larger than the second predetermined threshold number, and each image cell is defined by the outline of the waterdrop so that the luminance of the image cell is defined as a luminance of the outline of the waterdrop.

16. The controller according to claim 11, wherein the control means compulsorily operates the wiper on the basis of decision of a large degree of the waterdrop reflection even when the wiper has been operated with the intermittent wiping operation having a long time interval since the control means decided a small degree of the waterdrop reflection.

17. The controller according to claim 16, wherein the control means compulsorily operates the wiper in such a manner that the wiper is operated with a continuous wiping operation or an intermittent wiping operation having a short time interval.

18. The controller according to claim 11, wherein the control means compulsorily switches to operate the wiper with the intermittent wiping operation on the basis of decision of a small degree of the waterdrop reflection without depending on a previous wiping operation of the wiper.

19. The controller according to claim 18, wherein the control means compulsorily switches to operate the wiper with the intermittent wiping operation having a long time interval.

20. The controller according to claim 11, wherein the vehicle is an automotive vehicle, a train, a boat, or an airplane.

* * * * *